(12) United States Patent
Durojaiye et al.

(10) Patent No.: US 9,753,741 B2
(45) Date of Patent: *Sep. 5, 2017

(54) REMOTE INKING

(71) Applicant: Microsoft Technology Licensing, LLC, Redmond, WA (US)

(72) Inventors: Olumuyiwa M. Durojaiye, Bothell, WA (US); Sumit Mehrotra, Redmond, WA (US); Xiao Tu, Medina, WA (US); Manoj K. Biswas, Bellevue, WA (US); Steven P. Dodge, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 132 days.

This patent is subject to a terminal disclaimer.

(21) Appl. No.: 13/962,489

(22) Filed: Aug. 8, 2013

(65) Prior Publication Data

US 2013/0326544 A1 Dec. 5, 2013

Related U.S. Application Data

(63) Continuation of application No. 12/146,955, filed on Jun. 26, 2008, now Pat. No. 8,521,917.

(51) Int. Cl.
*G06F 3/00* (2006.01)
*G06F 9/44* (2006.01)
*G06F 13/10* (2006.01)

(52) U.S. Cl.
CPC .......... *G06F 9/4411* (2013.01); *G06F 13/105* (2013.01)

(58) Field of Classification Search
CPC ................ G06F 3/0488–3/04886; G06F 3/041

USPC .......................................................... 710/15
See application file for complete search history.

(56) References Cited

U.S. PATENT DOCUMENTS

| | | | |
|---|---|---|---|
| 4,317,197 | A | 2/1982 | Ulug |
| 5,579,481 | A | 11/1996 | Drerup |
| 5,845,282 | A | 12/1998 | Alley et al. |
| 5,870,610 | A | 2/1999 | Beyda |
| 6,055,552 | A | 4/2000 | Curry |
| 6,137,473 | A | 10/2000 | Cortopassi et al. |
| 6,151,611 | A | 11/2000 | Siegel |
| 6,301,012 | B1 | 10/2001 | White et al. |
| 6,701,380 | B2 | 3/2004 | Schneider et al. |
| 6,779,004 | B1 | 8/2004 | Zintel |

(Continued)

OTHER PUBLICATIONS

"Advisory Action", U.S. Appl. No. 12/146,955, (Mar. 26, 2013), 3 pages.

(Continued)

*Primary Examiner* — Titus Wong

(57) ABSTRACT

In one or more embodiments, a bus driver, included on a local computing system, enables detection of hardware available on a host computing system for a remote access session. Upon detecting a hardware device on the host computing system, an operating system included in the local computing system may obtain a device driver for controlling data captured from the hardware device. The device driver may be used to inject data captured from the hardware device into the local operating system's input stack. In some examples, the data is injected into the local operating system's input stack at a layer that corresponds to a layer at which the data was captured on the host computing system.

20 Claims, 4 Drawing Sheets

(56) References Cited

U.S. PATENT DOCUMENTS

| | | | |
|---|---|---|---|
| 6,870,555 B2 | 3/2005 | Sekiguchi | |
| 6,892,230 B1 | 5/2005 | Gu et al. | |
| 6,910,068 B2 | 6/2005 | Zintel et al. | |
| 7,039,234 B2 | 5/2006 | Geidl et al. | |
| 7,130,895 B2 | 10/2006 | Zintel et al. | |
| 7,426,721 B1 | 9/2008 | Saulpaugh et al. | |
| 7,437,434 B2 | 10/2008 | Zintel et al. | |
| 7,441,019 B2 | 10/2008 | Zintel et al. | |
| 7,600,050 B2 | 10/2009 | Aritomi | |
| 8,521,917 B2 | 8/2013 | Durojaiye et al. | |
| 2002/0073411 A1* | 6/2002 | Tsunedomi et al. | 717/171 |
| 2004/0183787 A1 | 9/2004 | Geaghan et al. | |
| 2004/0228532 A1 | 11/2004 | Fernandez et al. | |
| 2005/0179674 A1 | 8/2005 | Mehrotra et al. | |
| 2005/0289264 A1 | 12/2005 | Illowsky et al. | |
| 2006/0010368 A1 | 1/2006 | Kashi | |
| 2006/0121853 A1 | 6/2006 | Madhavan et al. | |
| 2006/0209016 A1 | 9/2006 | Fox et al. | |
| 2006/0265718 A1 | 11/2006 | Tsang et al. | |
| 2006/0290698 A1 | 12/2006 | Wang et al. | |
| 2007/0002827 A1* | 1/2007 | Lau et al. | 370/351 |
| 2007/0083518 A1 | 4/2007 | Mason et al. | |
| 2007/0264973 A1 | 11/2007 | Dowek et al. | |
| 2007/0273919 A1 | 11/2007 | Oomura | |
| 2008/0320500 A1* | 12/2008 | Li et al. | 719/324 |
| 2009/0327531 A1 | 12/2009 | Durojaiye | |

OTHER PUBLICATIONS

"DigiScribble—capture your handwriting with a normal ink pen and ordinary paper", Retrieved at <<http://www.redferret.net/?p=9589>>, (Nov. 15, 2007), 6 pages.

"Final Office Action", U.S. Appl. No. 12/146,955, (Jan. 16, 2013), 8 pages.

"Final Office Action", U.S. Appl. No. 12/146,955, (Oct. 25, 2011), 7 pages.

"Final Office Action", U.S. Appl. No. 12/146,955, (Jul. 15, 2010),13 pages.

"Final Office Action", U.S. Appl. No. 12/146,955, (Aug. 9, 2010),12 pages.

"Non-Final Office Action", U.S. Appl. No. 12/146,955, (Mar. 31, 2010),11 pages.

"Non-Final Office Action", U.S. Appl. No. 12/146,955, (May 29, 2012), 8 pages.

"Non-Final Office Action", U.S. Appl. No. 12/146,955, (Aug. 30, 2011), 7 pages.

"Notice of Allowance", U.S. Appl. No. 12/146,955, (Apr. 23, 2013),11 pages.

"White Paper: Nokia Digital Pen", Retrieved at <<http://whitepapers.silicon.com/0,39024759,60236027p,00.htm>>, (2007), 2 pages.

Stewart, Mike "Creating Table TC Applications with Microsoft Visual FoxPro", Retrieved at <<http://msdn2.microsoft.com/en-us/library/ms965060.aspx>>, (Mar. 2004), 11 pages.

* cited by examiner

REMOTE INKING

RELATED APPLICATIONS

This application is a continuation of and claims priority to U.S. patent application Ser. No. 12/146,955, filed on Jun. 26, 2008, the disclosure of which is incorporated by reference herein in its entirety.

BACKGROUND

Computing systems may permit users to remotely access the computing system. For example, a user may use a local computer system to access a host computing system connected by a network. However, a user's remote access session with a host computing system often does not mimic the user's direct access encounter with the host computing system, especially when involving a contact input device, such as a touch pad or touch screen, that detects properties of a physical contact.

SUMMARY

In one or more embodiments, a bus driver, included on a local computing system, enables detection of hardware available on a host computing system for a remote access session. Upon detecting a hardware device on the host computing system, an operating system included in the local computing system may obtain a device driver for controlling data captured from the hardware device. The device driver may be used to inject data captured from the hardware device into the local operating system's input stack. In some examples, the data is injected into the local operating system's input stack at a layer that corresponds to a layer at which the data was captured on the host computing system.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "module," for instance, may refer to system(s), computer-readable instructions (e.g., one or more computer-readable storage media having executable instructions), and/or procedure(s) as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The use of similar reference numbers in different instances in the description and the figures may indicate similar or identical items.

DETAILED DESCRIPTION

Overview

Figure 1:
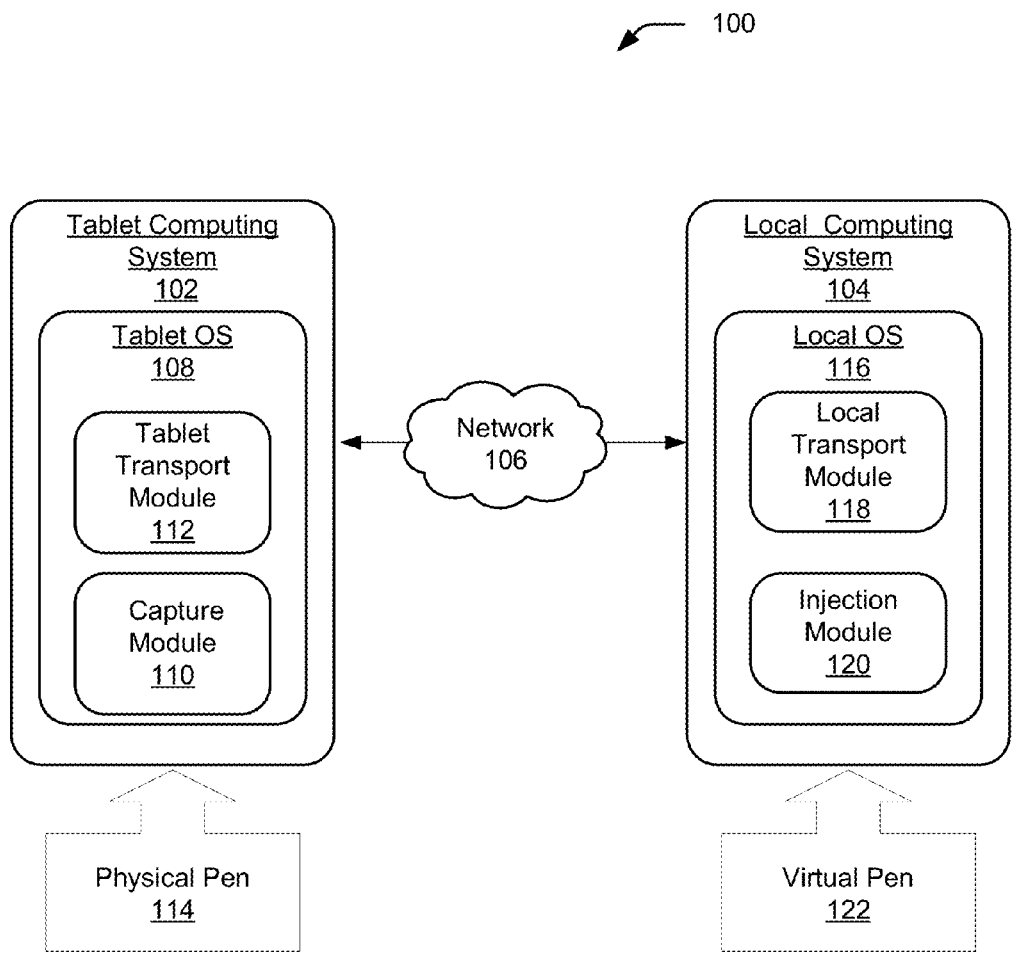
FIG. 1 is an illustration of an environment in which an example local computing system injects data from a tablet computing system.

Computing systems with a hardware device, such as a tablet computing system including a touch screen, may be configured to support remote access, e.g., act as a host computing system. A variety of hardware devices may be used by the computing system, such as contact input devices, digital audio microphones, and so on.

When supporting remote access, for instance, the tablet computing system may provide data captured from the touch screen to a local computing system. For example, the tablet computing system may employ the touch screen to digitize physical contact between a stylus and the touch screen. However, in some instances, a local computing system remotely accessing the tablet computing system may not receive the data captured from the touch screen. The local computing system, for instance, may not know about the touch screen and/or how to receive the data. Consequently, the local computing system may not support touch screen features that are available during a direct access session with the tablet computing system, e.g., when the tablet computing system is directly accessed. Thus, the local computing system may not support the touch screen's pen features including handwriting recognition, pen feedback, pen gestures, text input using handwriting, and so on that are available during a direct access session.

Procedures are described to provide data to a local computing system data that was captured from a hardware device included on a host computing system during a remote access session, such as a digitizer in the tablet computing system's touch screen. In one or more embodiments, a bus driver on the local computing system is implemented to detect the hardware device. For example, the bus driver may be configured to be "aware" of the digitizer in the tablet computing system.

Upon detecting a hardware device on the host computing system, the bus driver may send the local operating system a bus signature (e.g., a bus signature compliant with plug-and-play technology) that makes the operating system aware of a hardware device. In response to receiving the bus signature, the operating system may obtain a device driver corresponding to the bus signature and the hardware device. The device driver is loaded on the local computing system to listen for data packet(s) (e.g., remote data packets) that contain data captured from the hardware device.

When the local computing system receives a remote data packet, data within the remote data packet may be injected into the local operating system's input stack at a layer that corresponds to a layer at which the data was captured on the host computing system. Further discussions of injecting data captured from a hardware device during a remote access session may be found in relation to FIGS. 1-4.

In the following discussion, an "Example Environment" is first described that may employ procedures to inject data captured from a hardware device into a local operating system's input stack during a remote access session. A sample computing system is then described. "Example Procedures" are also described that may be employed in the example environments, as well as in other environments. Although these, systems and procedures are described as employed within a computing environment in the following discussion, it should be readily apparent that these structures, modules, procedures, and approaches may be incorporated within a variety of environments without departing from the spirit and scope thereof. Exemplary computing type environments include, but are not limited to, media players, remote controls, smart phones, personal digital assistants, personal audio devices, global positioning systems, Internet appliances, wireless connectivity devices, vehicle control systems, vehicle entertainment systems, and so on.

Example Environment

FIG. 1 is an illustration of an environment 100 in accordance with one or more embodiments. The environment 100 includes a tablet computing system 102 (e.g., acting as a host computing system) and a local computing system 104 that is communicatively coupled to the tablet computing system 102 by a network 106. Suitable networks include, but are not limited to, local area networks, wide area networks, the Internet, wireless communication networks, direct connections (e.g., a universal serial bus cable (USB)), cellular communication networks, and so on. The tablet computing system 102 and the local computing system 104 may be configured in a variety of ways, examples of which may be found in relation to FIGS. 2 and 3.

As illustrated, the tablet computing system 102 includes an operating system (e.g., a tablet operating system 108 or the operating system executing on the tablet computing system) for controlling programs, drivers, applications, and the like executing on the tablet computing system 102. The tablet computing system 102 may also include a capture module 110 and a tablet transport module 112 within the tablet operating system 108. In implementations, the tablet computing system 102 may be a portable "laptop" type computing system, a desktop computing system including a touch screen or touch pad. In implementations, the tablet computing system's operating system may be WINDOWS XP TABLET OPERATING SYSTEM or WINDOWS VISTA OPERATING SYSTM (both of which are a registered trademarks of Microsoft Corporation, Redmond, Wash.) that may accept stylus/pen user input (e.g., ink data) as a native data type.

The capture module 110 may be configured to capture data from a hardware device (such as a touch screen, a touch pad and so on) that digitizes data from physical contact with a touch sensitive device, e.g., a "physical pen 114". For example, the capture module 110 may capture data that represents properties of the physical pen 114 (e.g., a stylus) with the touch screen. Properties include, but are not limited to, location, tilt, pressure, and so on. In other examples, the capture module 110 captures and/or digitizes data from a microphone or another hardware device on the tablet computing system 102.

The capture module 110 may capture the data at a particular layer of the tablet operating system's input stack, such as a "lowest most layer" of the tablet operating system's input stack, e.g., driver/hardware layer. An input stack may be for a particular type of data, for example, mouse type data may be input into a mouse input stack while data from a pen is input in an ink input stack. Capturing data at the lowest most layer of the tablet operating system's input stack may minimize complexity associated with considering the input stack's "higher" layers, e.g., platform layer and so on. In this manner, higher layers of the tablet operating system's input stack may not be considered when communicating during a remote access session.

The tablet transport module 112 is representative of functionality to communicate the data captured by the capture module 110. For example, the tablet transport module 112 may send the data captured by the capture module 110 in remote data packet(s) in real-time and/or in near real-time over the network 106 to the local computing system 104. While the data included in the remote data packet is captured at a particular layer of the input stack, the tablet transport module 112 may employ transmission control protocol (TCP) when communicating the data included in the remote data packet. If security is desired during transport, the tablet transport module 112 may employ remote desktop protocol for secure communication. During a remote session, the tablet computing system 102 and the local computing system 104 may be configured as a virtual private network (VPN).

As illustrated, the local computing system 104 includes a local operating system 116 for controlling operation of programs, drivers, applications, and the like. A local transport module 118 and an injection module 120 are also included on the local computing system 104 and may operate or function on behalf of the local operating system 116, e.g., the operating system executing on the local computing system 104.

The local transport module 118 may be included in the local computing system 104 to communicate with the tablet computing system 102 and/or other remote data sources. For example, the local transport module 118 decrypts remote data packet(s) received from the tablet computing system 102 as part of the remote access session.

The injection module 120 is representative of functionality to inject or insert the data included in the remote data packet(s) into the local operating system's input stack. The injection module 120 may inject the data at a layer of the local operating system's input stack that corresponds to a layer at which the data was captured on the tablet computing system 102. For example, the injection module 120 may inject the data at the driver layer/hardware layer so that the data flows up the local operating system's input stack, such as the ink input stack, rather than accounting for the layers in the tablet operating system's input stack (that may differ from the local operating system's input stack). In this manner, the local computing system 104 may function or behave as if the physical pen 114 provided user inputs, e.g., a virtual pen 122 mimics the physical pen 114 for the tablet computing system 102.

Figure 2:
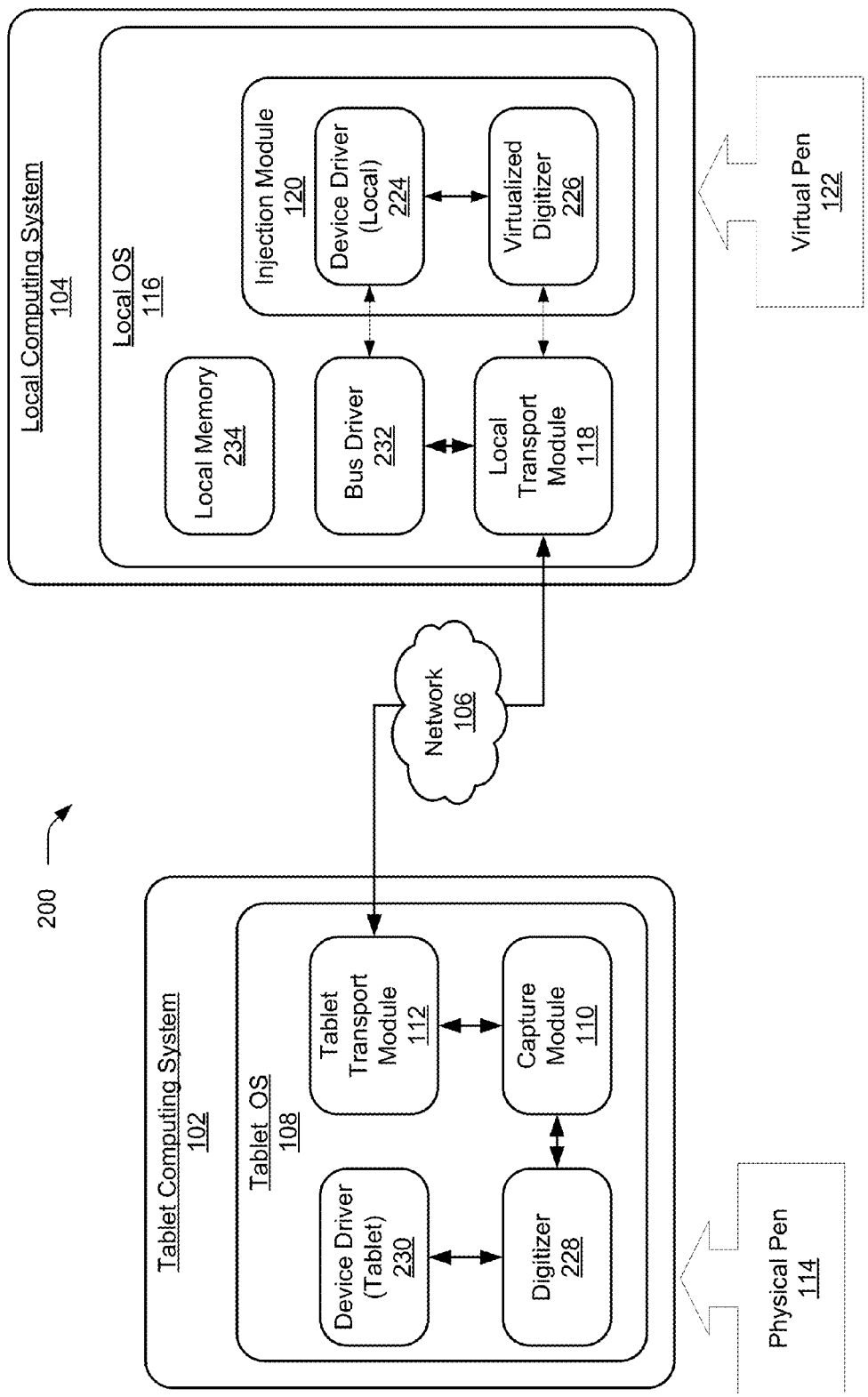
FIG. 2 is an illustration of an environment in an example implementation in which a local computing system of FIG. 1 is illustrated as implementing a bus driver.

FIG. 2 illustrates an environment 200 including the tablet computing system 102 and the local computing system 104 in accordance with one or more embodiments of FIG. 1 in which a device driver (local) 224 in the local computing system's injection module 120 injects the data captured on the tablet computing system 102 into the local operating system's input stack. The device driver (local) 224 may inject the data into the local operating system's input stack at a layer that corresponds to the layer at which the data was captured on the tablet computing system 102, e.g., a physical layer. The designation of the device driver as "(local)," may reflect the location and/or version of the bus driver, e.g., within the local operating system. In some examples, the device driver (local) may be substantially similar to a device driver 230 included on the tablet computing system 102.

The local computing system 104 is illustrated as implementing a "virtualized digitizer 226" that mimics a digitizer 228 (e.g., a hardware device) on the tablet computing system 102 so that data captured from the tablet computing system's digitizer 228 may be tunneled to the local computing system 104. In this manner, the data from the digitizer 228 may be accessible to the local computing system 104 during a remote access session and may appear as if it came from the digitizer 228 "on the local computing system" 104, e.g., appears as if the data came from the "real" digitizer 228.

In one or more embodiments, the local computing system 104 includes a bus driver 232 configured to detect or be aware of hardware that is available on the tablet computing system 102. For example, the bus driver 232 may detect that the tablet computing system 102 includes the digitizer 228 that generates data from a user contacting the touch screen with a stylus (not shown). The bus driver 232 may determine the presence of the digitizer 228 based on signaling conducted as part of initializing a remote access session, based on data communication, and so on. For example, the bus driver 232 may be configured to open a communication channel with the host computing system (e.g., the tablet computing system 102) to detect available hardware devices in response to a connection request.

In response to detection of the digitizer 228 (e.g., by receiving a connection request), the bus driver 232 may send the local operating system 116 a bus signature associated with the digitizer 228. For example, the bus driver 232 may form a communication to send the bus signature to the local operating system 116. The bus signature may be used to make the local operating system 116 aware of the digitizer 228. In some examples, the bus signature is compliant with plug-and-play technology that makes the local operating system 116 aware of the digitizer 228 on the tablet computing system without manual installation of digitizer software.

Upon being made aware of the tablet computing system's digitizer 228, the local operating system 116 may obtain a device driver (local) 224 configured to control the digitizer, e.g., as if the data was coming from the digitizer 228, e.g., the "real" digitizer. In some instances, the local computing system may have the device driver 224, e.g., the local operating system obtains the device driver from local memory 234 included in the local computing system 104. In other instances, the local operating system 116 may obtain the device driver (local) 224 from a variety of remote sources including third party sources when the local computing system 104 does not have a device driver that matches the bus signature. For example, the local operating system 116 may obtain a copy or version of a device driver (tablet) 230 from an update service that provides device driver(s) such as MICROSOFT WINDOWS UPDATE (Microsoft Corporation, Redmond, Wash.).

The local operating system 116 may then load the device driver (local) 224 onto the local computing system 104. With the device driver loaded on the local computing system 104, the device driver (local) 224 may control data from the hardware device on behalf of the local operating system 116. For example, the device driver (local) 224 may control the flow of data into the local operating system's input stack.

The device driver (local) 224 may be configured to listen for a remote data packet(s) that include data captured from the tablet computing systems digitizer 228. For example, the device driver (local) 224 may listen to the local transport module 118 for a signal or other indication that a remote data packet has been received. In other examples, listening includes receiving the data from the local transport module 118. For example, the local transport module 118 may forward the device driver (local) 224 the data captured from the digitizer 228 on the tablet computing system 102 while stripping out data used to communicate the data over the network 106.

Figure 3:
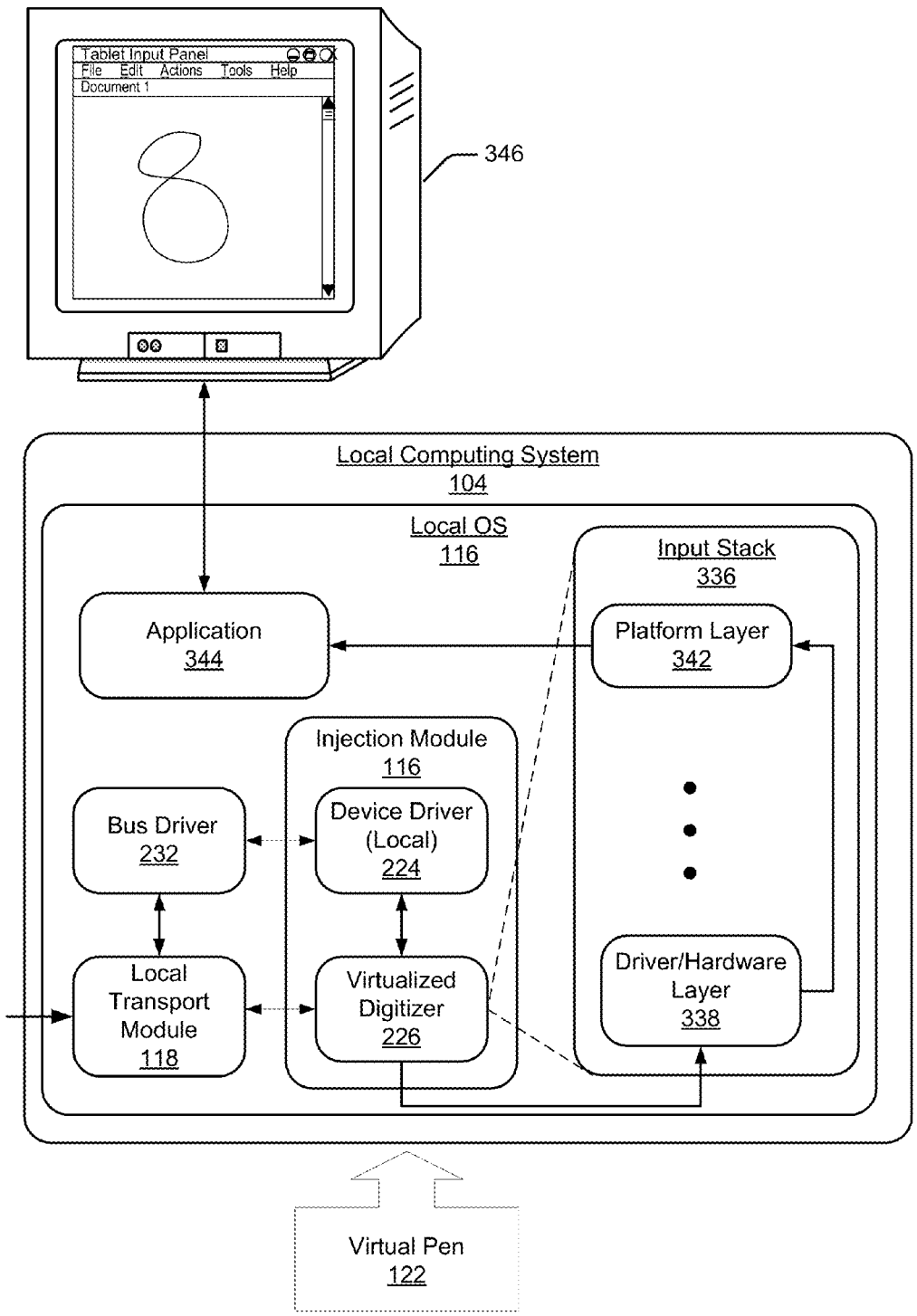
FIG. 3 is an illustration of a local system in an example implementation in which data include in a remote data packet is injected into a local operating system's input stack at a driver/hardware layer.

FIG. 3 depicts in an example implementation showing the device driver (local) 224 in the injection module 120 as injecting data into the local operating system's input stack 336. The local computing system 104 may be communicatively coupled to the tablet computing system 102 as shown and described with respect to FIGS. 1 and 2.

The device driver (local) 224 included in the local computing system's injection module 120 may be configured to inject or insert the data into the local operating system's input stack 336 based on what layer the data was captured on the tablet computing system 102. For example, the device driver (local) 224 may inject the data as data from a hardware layer 338 (e.g., raw data coming from a hardware device) rather than data that is from a higher layer. For example, instead of injecting the data at a platform layer 342, the device driver 224 injects the data at the hardware layer 338 because the data was captured on the tablet computing system 102 before being transformed for higher layers of the tablet operating system's input stack (not shown). The device driver (local) 224 may know what layer the data should be injected based on the data itself, based on signaling associated with initializing the remote access session, or other data included in the remote data packet.

In some embodiments, capturing data at the hardware or driver layer may minimize the complexity of injecting the data, as the data has not been transformed for higher layers of the tablet operating system's input stack. For example, by capturing (and injecting) data at the hardware layer 338, the local computing system 104 does not account for issues associated with higher layers of the tablet operating system's input stack.

Thus, when the device driver (local) 224 injects the data into the local operating system's input stack 336 the data appears to come from the digitizer 228 (e.g., the "real" digitizer) and appears to be native to the local computing system 104. As a result, the local computing system 104 may not address data conversion that typically is performed to make the data conform to the tablet operating system's input stack.

As illustrated in the example of FIG. 3, when a user is drawing the number "8" on a touch screen, the device driver (local) 224 may inject the data representing the number "8" into the local operating system's input stack 336, e.g., the ink input stack. If the data is injected at a low layer, the data may be manipulated before being consumed by an application 344. The application may, for example, output the data on a tablet input panel displayed on a monitor 346.

In one or more other embodiments, network 106 data communication may be reduced by configuring one or more of the device driver (local) or the local transport module 118 to recreate data. For example, instead of consuming network communication resources with remote data packets that have not changed in comparison to the data in a previous remote data packet, the tablet transport module 112 may send a place-holding packet (e.g., a subsequent remote data packet) with a limited amount of data. Upon receiving the place-holding packet, the device driver (local) 224 may recreate the data from previous remote data packet(s).

In other examples, if the device driver (local) 224 does not receive data within a scheduled time period, the device driver (local) 224 may recreate and inject the recreated data into the local operating system's input stack. For example, the device driver (local) 224 may recreate the data from previous remote data packet(s) when no data is captured from the digitizer 228 or the tablet transport module 112 does not send a remote data packet. The tablet transport module may not send a remote data packet because the included data may not represent a change in comparison to the data in a previous remote data packet.

In one or more embodiments, the device driver (local) 224 may manipulate the data (such as before inserting the data)

to make the data appear to be a different type of data. For example, while the data may have been captured as ink data associated with a pen, the device driver (local) 224 can manipulate the data so that the data appears to be touch data associated with a user touching his/her finger to a touch screen.

The components, modules, functions, and procedures discussed above may be implemented singly or in combination based on design preference. Generally, any of the modules and functions described herein can be implemented using software, firmware, hardware (e.g., fixed logic circuitry), manual processing, or a combination of these implementations. The terms "module," "functionality," and "logic" as used herein generally represent software, firmware, hardware or a combination thereof. Additionally, functions can be embodied as executable instructions that are included in one or more computer-readable storage media. The features of the procedures described below are platform-independent, meaning that the procedures may be implemented on a variety of platforms having a variety of processors and memory.

The following discussion describes transformation procedures that may be implemented utilizing the previously described structures, modules, approaches, and procedures. Aspects of the modules may be implemented in hardware, firmware, software, or a combination thereof. The procedures are shown as a set of blocks that specify operations performed by one or more devices and are not necessarily limited to the orders shown for performing the operations by the respective blocks.

Example Procedures

The following discussion describes procedures that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. A variety of other examples and sub-procedures are also contemplated.

Figure 4:
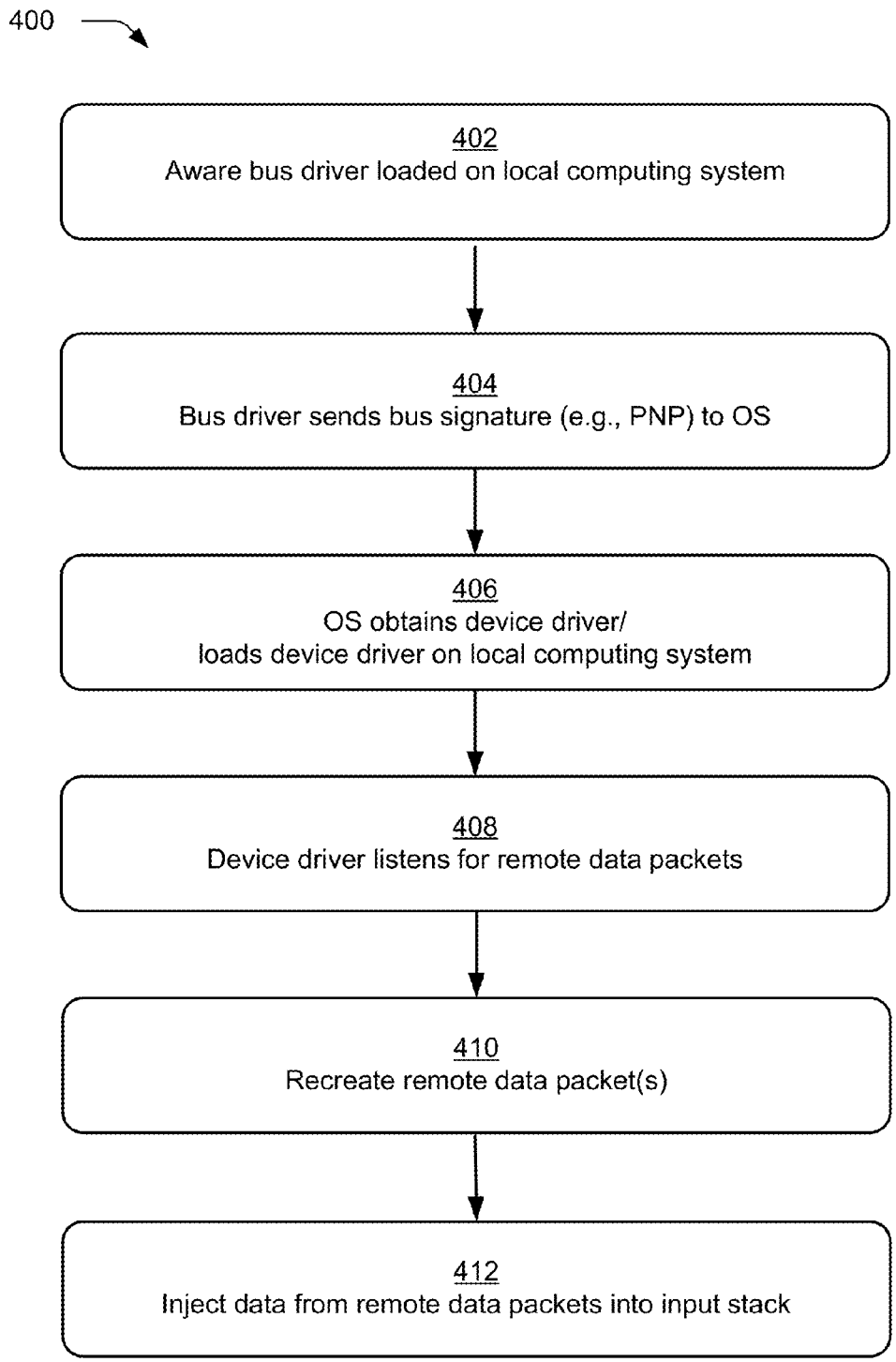
FIG. 4 is a flow diagram depicting a procedure in an example implementation by which data included in remote data packet is injected into an input stack at a lowest most layer of the input stack.

FIG. 4 depicts a procedure 400 in an example implementation in which data injection procedures are described including initializing a remote access session.

At block 402, a bus driver may be loaded on a local computing system. The bus driver 232 may be configured to detect or be aware of hardware available on the host computing system, such as the digitizer 228 on the tablet computing system 102. For example, the bus driver may open a communication channel with the host computing system such that bus driver becomes aware of hardware in response to receiving a communication request. In some embodiments, the bus driver 232 may be loaded as part of initializing a remote access session or upon starting-up the local computing system 104 including the bus driver 232.

At block 404, an operating system may be sent a bus signature. For example, upon detecting the hardware device on the host computing system, the bus driver 232 may form and send a communication (e.g., on a computing system performing the method 400) that makes the local operating system 116 aware of the hardware device without manual installation of software associated with the hardware device on the host computing system. In this manner, the operating system may be made aware of the hardware device on the host computing system.

At block 406, a device driver that is configured to control operation of the hardware device may be obtained. For example, the operating system may obtain and load a copy of the device driver from memory or from a third party provider, such as an update service.

At block 408, the device driver listens for remote data packets that include data captured from a hardware device. For example, the obtained device driver may listen for remote data packets communicated over the network 106 or may listen to the local transport module 118 for data that was captured from the hardware device (for which the device driver may be configured to control). In embodiments, the device driver may listen by receiving the data included in the remote data packet from the local transport module 118.

At block 410, remote data packets and/or data captured from a hardware device on the host computing system may be recreated. For example, if a remote data packet is not received within an expected amount of time, data from a previous remote data packet may be used to recreate the data and/or remote data packet that was not received. In the previous example, the remote data packet that was expected but not received within an allotted time may not have been sent because the data that would have been included in the remote data packet did not represent a change in comparison to previous remote data packet(s).

In another example, a remote data packet from a previous remote data packet may be used to recreate a remote data packet that has a limited amount of data, e.g., a place-holding packet. In the foregoing example, instead of sending a remote data packet with data that does not represent a change (from data in the previous remote data packet) the place holding packet may be used to indicate that data should be recreated. As a result, overall data communication may be minimized over sending and receiving a remote data packet including data that does not represent a change from the data included in previous remote data packets.

At block 412, data included in the remote data packet is injected into the local operating system's input stack. For example, ink data that represents user input captured from the touch screen may be injected into the local operating system's input stack (e.g., the ink input stack) that may be established as part of initialing the remote access session. In some embodiments, the device driver controls the data being injected into the input stack. The data may be injected in the input stack at a layer that corresponds to a layer on the host device from which the data was captured

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
  detecting, by a bus driver within a local operating system, a digitizer on a host computing system;
  sending a bus signature that makes the local operating system aware of the digitizer detected on the host computing system, the bus signature being sent from the bus driver within the local operating system;
  the sending causing the local operating system to obtain a device driver for the local operating system from a third party update service, the device driver configured to control touch data captured by the digitizer for the local operating system;

receiving a data packet comprising touch data from the digitizer; and injecting, with the obtained device driver, the received data packet into an input stack of the local operating system.

2. The method of claim 1, wherein the device driver is configured for use with one or more of a touch pad or a touch screen.

3. The method of claim 1, wherein the device driver is configured for use with one or more of a contact input device or a microphone.

4. The method of claim 1, wherein injecting the received data packet into an input stack of the local operating system comprises injecting the touch data into the local operating system's input stack at a layer that corresponds to a particular said layer at which the touch data was captured.

5. The method of claim 1, wherein the bus signature is plug-and-play compliant.

6. The method of claim 1, wherein injecting the received data packet into an input stack of the local operating system comprises injecting the touch data into the local operating system's input stack at lowest most layer of the local operating system's input stack.

7. A computing device comprising:
a bus driver configured to:
receive a request from a host computing system to begin a remote access session;
open a communication channel with the host computing system to detect available hardware devices on the host computing system in response to receiving the request;
detect a hardware device on the host computing system via the communication channel; and
send a bus signature of the hardware device detected on the host computing system; and
an operating system configured to:
receive, from the bus driver, the bus signature for the hardware device detected on the host computing system;
obtain a device driver that corresponds to the received bus signature to control ink data captured from the hardware device for the operating system, the ink data generated at the host computing system by contact of a stylus with a touch screen or a touch pad of the host computing system; and
manipulate, with the device driver, captured ink data obtained from the host system so that the captured ink data appears to be touch data.

8. The computing device of claim 7, wherein the hardware device is a digitizer on the host computing system that digitizes the contact of the stylus with the touch screen or the touch pad of the host computing system.

9. The computing device of claim 7, wherein the device driver is configured for use with one or more of the touch pad or the touch screen.

10. The computing device of claim 7, wherein the bus signature is plug-and-play compliant.

11. The computing device of claim 7, wherein the device driver is further configured to inject the manipulated touch data into the operating system's input stack at a layer that corresponds to a particular said layer at which the ink data was captured.

12. One or more computer-readable storage devices comprising instructions stored thereon that, responsive to execution by a processor perform operations comprising:
opening a communication channel with a host computing system responsive to receiving a request from the host computing system to begin a remote access session;
detecting a digitizer on the host computing system via the communication channel;
forming a communication to send a bus signature that corresponds to the digitizer detected on the host computing system;
sending the bus signature to a local operating system, the sending causing the local operating system to obtain a device driver that corresponds to the bus signature from a third party provider, the third party provider being different from the local operating system and the host computing system; and
injecting data captured from the digitizer into an input stack of the local operating system at a layer that corresponds to a layer at which the data was captured at the host computing system.

13. The one or more computer-readable storage devices of claim 12, wherein the data comprises touch data captured at the host computing system.

14. The one or more computer-readable storage devices of claim 12, wherein the device driver is configured for use with one or more of a touch pad or a touch screen.

15. The one or more computer-readable storage devices of claim 12, wherein the data comprises touch data generated at the host computing system by contact with a touch screen or a touch pad of the host computing system.

16. The one or more computer-readable storage devices of claim 12, wherein the data comprises touch data generated at the host computing system by contact of a stylus with a touch screen of the host computing system.

17. The one or more computer-readable storage devices of claim 12, wherein the data comprises touch data generated at the host computing system by contact of a user's finger with a touch screen of the host computing system.

18. The method of claim 1, wherein the touch data is generated at the host computing system by contact with a touch screen or a touch pad of the host computing system.

19. The method of claim 1, wherein the detecting comprises detecting the digitizer on the host computing system in response to receiving a request from the host computing system to begin the remote access session.

20. The one or more computer-readable storage devices of claim 12, wherein the bus signature is plug-and-play compliant.

* * * * *